United States Patent

Widl et al.

[15] 3,638,142

[45] Jan. 25, 1972

[54] FREQUENCY SHIFT MODULATOR WITH AMPLITUDE COMPENSATION

[72] Inventors: Walter Herbert Erwin Widl, Bandhagen; Erik Herbert Olofsson, Skarholmen, both of Sweden

[73] Assignee: Telefonaktiebolaget LM Ericsson, Stockholm, Sweden

[22] Filed: July 20, 1970

[21] Appl. No.: 56,362

Related U.S. Application Data

[63] Continuation-in-part of Ser. No. 672,218, Oct. 2, 1967, abandoned.

[52] U.S. Cl. ....................................332/9, 325/163, 328/35, 332/16, 332/18

[51] Int. Cl. ........................................H04l 27/12, H03c 3/04

[58] Field of Search ...................332/9, 16, 16 T, 9 T, 18, 29, 332/14; 325/30, 163; 178/66, 67, 88; 331/179; 328/22, 31, 36; 307/261

[56] References Cited

UNITED STATES PATENTS

| | | | |
|---|---|---|---|
| 2,897,275 | 7/1959 | Bowers | 332/9 X |
| 3,113,274 | 12/1963 | Utt | 328/35 X |
| 3,350,575 | 10/1967 | Crouse | 307/261 |
| 3,480,572 | 10/1968 | Wolf et al. | 332/14 X |

*Primary Examiner*—Alfred L. Brody
*Attorney*—Hane, Baxley & Spiecens

[57] ABSTRACT

A frequency modulator apparatus receives pulse signals switching between two amplitudes. The pulse signals are fed, via a modulator means which transmits square wave signals switching between two frequencies, to an integrator means. The integrator means converts the square wave signals to triangular-shaped signals which are then converted to substantially sinusoidal signals. There is also included means for compensating for the frequency dependent changes in amplitude of the signals introduced by the integrator means.

6 Claims, 5 Drawing Figures

INVENTORS
WALTER HERBERT ERWIN WIDL
ERIK HERBERT OLOFSSON
BY
Hane, Baxley and Spiecens
ATTORNEYS INVENTORS
WALTER HERBERT ERWIN WIDL
ERIK HERBERT OLOFSSON
BY
Hane, Baxley and Spiecens
ATTORNEYS

FREQUENCY SHIFT MODULATOR WITH AMPLITUDE COMPENSATION

The present invention refers to a frequency shift modulator, especially suitable for use in data transmission devices, and is a continuation-in-part of our copending application Ser. No. 672,218 filed Oct. 2, 1967, now abandoned.

In data transmission devices according to international standards (International Telegraph and Telephone Consultative Committee) the frequency shift is made between 1,300 Hz. and 1,700 Hz. at a modulation speed of 600 bands and between 1,300 Hz. and 2,100 Hz. at a modulation speed of 1,200 bands. In order to obtain a transmission which is as reliable as possible, the transmitted signal must not contain disturbing spectral components generated by the modulator. In the known devices these components are eliminated by a so-called transmission filter, so that an acceptable signal is obtained. Especially in data transmission, however, these filters are theoretically difficult to obtain because of the relatively great bandwidth—800 Hz. shift on a center frequency of 1,700 Hz.

Generally, the use of a frequency shift modulator for a sinusoidal output signal has the disadvantage that highly disturbing transients appear at the change from one frequency to the other. This depends on the fact that, in order to obtain the frequency shift, the reactance, i.e., capacitance or inductance of a tuned circuit is shifted, thus momentarily changing the energy stored in the reactance devices.

An object of the invention is to provide such modulators which shift in frequency without generating any undesired transients.

Briefly, in accordance with the invention these transients are avoided by generating the frequency shift without the use of capacitances and inductances. The frequency shift is carried out by the use of an FM (frequency-modulated) oscillator connected to a pulse shaping circuit for generation of a square wave. An integrator circuit is connected thereto for changing the square wave to a triangular-shaped wave. A compensator circuit for compensating the frequency-dependent-amplitude change caused by the integrator circuit, together with a nonlinear frequency independent attenuator, change the triangular-shaped wave to an approximately sinusoidal wave.

The invention will be further described with reference to the accompanying drawing in which:

FIG. 4 is a schematic diagram of one of the blocks of FIGS. 1 and 2; and

FIG. 5 is a schematic diagram of another embodiment of the apparatus of FIG. 4.

Figure 1:
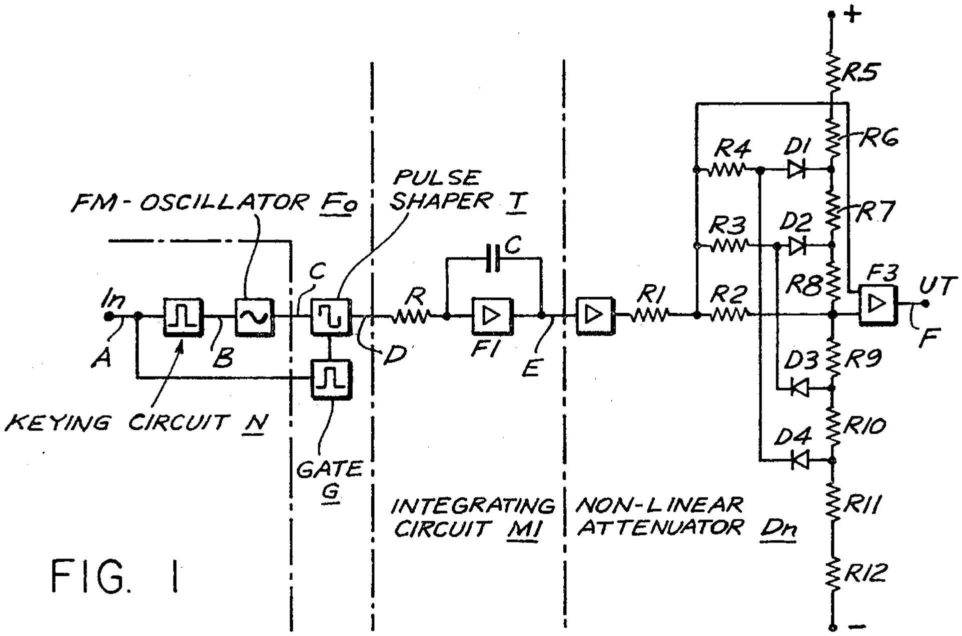
FIG. 1 is a block diagram of one embodiment of the invention.

The device according to FIG. 1 comprises a keying circuit N and an FM-oscillator FO of the type not containing any tuned circuits or coils. The oscillator may thus contain a so-called unijunction transistor or may be designed as a multivibrator. In the first case, the oscillator generates pulses of short duration; in the latter case the oscillator generates a square wave signal. In both cases a frequency is obtained—high or low—that is defined by the keying circuit, i.e., depends upon the data flow applied to the keying circuit.

The FM-oscillator FO is connected to a pulse shaping circuit T, for instance a so-called Schmitt trigger, for shaping the signal to symmetrical square wave signals. There is connected to the pulse shaping circuit a gate G for regulating the amplitude of the signal, as further explained below.

The pulse-shaping circuit T is connected to an integrating circuit M1, for instance, a so-called Miller integrator, comprising an amplifier F1, a capacitor C and a resistance R. The integrating circuit produces a triangular-shaped signal which, in a nonlinear attenuator D*n*, is transformed into an approximately sinusoidal signal. The attenuator, known per se, comprises a voltage divider consisting of a number of resistors R5–R12, connected in series between a positive and a negative potential source, together with a plurality of rectifiers D1–D4 connected to the voltage divider. The rectifiers are located in pairs symmetrically with respect to the neutral point of the voltage divider. In this way the rectifiers are supplied with different threshold voltages, and by means of a second, conveniently dimensioned voltage divider comprising an additional number of resistors R1–R4, an adequate shaping of the signal is obtained, so that it approaches the sinusoidal form with the desired precision. Finally, the signal is amplified by a buffer amplifier F3 to obtain an adequate amplitude for transmission on the line.

Figure 3:
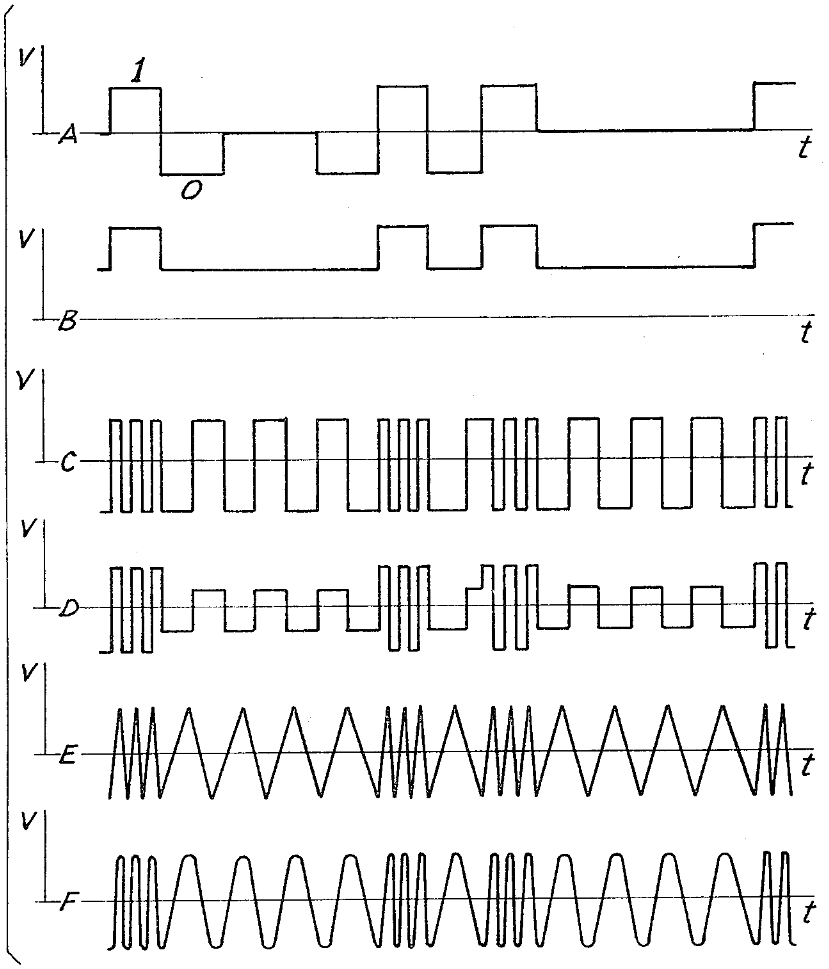
FIG. 3 shows waveforms for explaining the operation of the embodiments of the invention.
Figure 3:
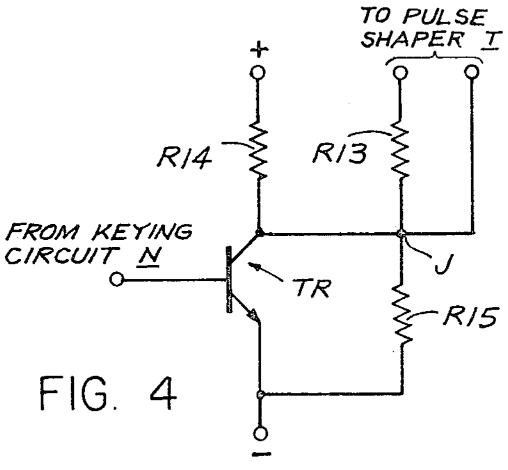
Figure 3:
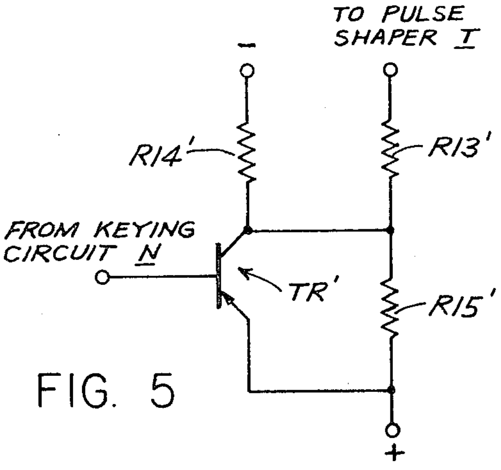

The operation of the device is explained with reference to FIG. 3 which shows the waveform of the signal at points A–F of FIG. 1. The data flow applied to the input I*n* of the device is shown as waveform A. The digit "1" is indicated by a positive pulse while the digit "0" is indicated by a negative pulse. After having passed the keying circuit N, the signal has the appearance shown in waveform B. The absence of a digit gives the same signal element as the digit "0" which in this case presupposes that the transmitted information contains a predetermined number of signal elements (bits) per character.

Waveform C is the signal at the output of the FM-oscillator FO. The signal is a square wave that for the digit "1" has a high frequency, for example, 2,100 Hz. and for the digit "0" has a low frequency such as 1,300 Hz. After passing through the pulse shaping circuit T, the low-frequency signal has a lower amplitude than the high-frequency signal, waveform D. This is obtained in a known way by means of the gate G so as to compensate in advance for the amplitude changing characteristic of the subsequent integrator circuit M1 because an integrator, when supplied with an incoming signal of constant amplitude, transmits a signal having an amplitude which is inversely proportional to the frequency of the input signal. The gate G hereinafter described, changes the amplitude by connecting or disconnecting an attenuation resistor.

After the integrator circuit M1, the signal has the triangular shape waveform E. Provided the gate G is correctly adjusted, the same amplitude will be obtained at both frequencies. After having passed through the attenuator D*n* the signal has a form which approximates the sinusoidal waveform F.

In FIG. 4 there is shown the gate G comprising: a transistor TR having a base connected to the input of keying circuit N, an emitter connected to a negative potential, and a collector connected via resistor R13 to pulse shaper T; and a pair of serially connected resistors R14 and R15 between a positive potential and the negative potential. The junction of resistors R14 and R15 is connected to the collector of the transistor and pulse shaper T. Resistors R14 and R15 form a potential divider to establish a voltage at junction J. When the transistor is nonconducting, during the occurrence of an "0," junction J is at one potential. When the transistor is conducting, during the occurrence of a "1" resistor R15 is shorted out and junction J is at the negative potential. The potential of junction J controls the operating point of pulse shaper T and consequently the amplitude of its output signal.

In FIG. 5 there is shown another embodiment of the gate G comprising attenuation resistors R13′ and R15′ connected in series between pulse shaper T and a positive voltage +V. Connected in parallel with attenuation resistor R15′ is a transistor switch comprising resistor R14′ and transistor TR′. In particular, the collector of transistor TR′ is connected to the junction of resistors R13′ and R15′ while the emitter of transistor TR′ is connected to positive voltage source +V. Collector resistor R14′ connects the collector of transistor TR′ to a source of operating potential −V. The base of transistor TR′ is connected to keying circuit N.

Now it should be noted that for this embodiment attenuation resistors R13′ and R15′ are connected to the output of pulse shaper T so that the source impedance of shaper T is in series with attenuation resistors R13′ and R15′ and the amplitude of the output signal is a function of the sum of values of resistors R13′ and R15′. As this value decreases the amplitude of the output signal decreases. Thus, when the transistor switch is open, i.e., transistor TR' is nonconducting, both resistor R13' and R15' are operatively connected to the output of pulse shaper T and the amplitude of the output signal therefrom is of large amplitude. When the transistor switch is closed, i.e., transistor TR fully conducting, resistor R15' is switched out of the circuit because transistor TR' provides a short circuit around resistor R15'. Therefore, the amplitude of the output signal from pulse shaper T is low.

The opening and closing of the transistor switch are controlled by the signal fed to the base of transistor TR' from keying circuit N. Upon the receipt of a "1" the transistor TR' is cut off and upon the receipt of a "0" the transistor TR' is fully conducting.

Instead of the disclosed FM-oscillator, and oscillator utilizing a unijunction transistor may be used. Such an oscillator gives pulses of short duration instead of waveform C. There is, however, no essential difference, since the subsequent waveforms D, E and F are the same as before.

Figure 2:
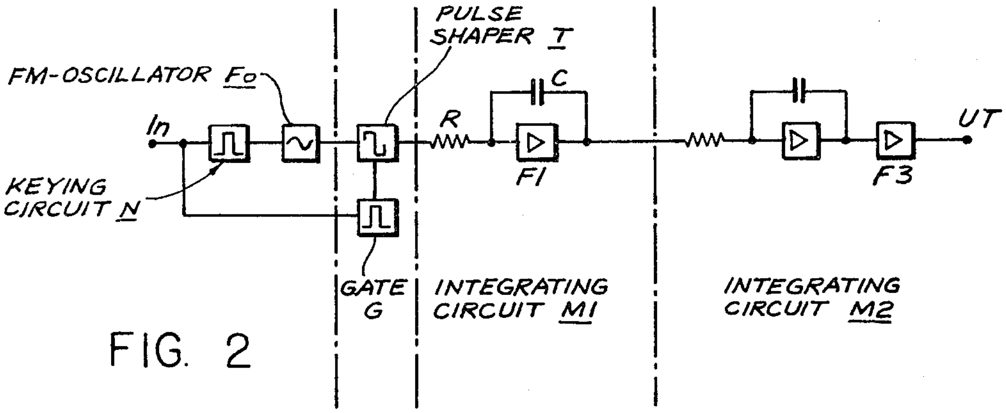
FIG. 2 is a block diagram of another embodiment of the invention.

In the embodiment shown in FIG. 2 the nonlinear attenuator DN has been replaced by another integrator M2 which feeds output buffer amplifier F3.

What is claimed is:

1. A frequency shift modulating apparatus comprising frequency modulator means having an input adapted to receive an input signal switching between two amplitudes and having an output terminal for transmitting a square wave signal whose frequency switches between two frequencies in correspondence with the switching between the two amplitudes of the input signal, an integrator means having an input connected to the output of said frequency modulator means and an output for converting said square wave signal to a triangular-shaped signal, amplitude compensation means for compensation for the frequency-dependent changes in amplitude of the triangular-shaped signal caused by said integrator means, and signal-shaping means connected to the output of said integrator means for converting the triangular-shaped signal to a substantially sinusoidal-shaped signal.

2. The apparatus of claim 1 wherein said frequency modulator means comprises a keying circuit adapted to receive the input signal, an FM-oscillator connected to said keying circuit and a pulse shaping circuit connected to said FM-oscillator.

3. The apparatus of claim 2 wherein said signal shaping means is a nonlinear frequency independent attenuator.

4. The apparatus of claim 3, wherein said attenuator comprises a first voltage divider and a second voltage divider, said first voltage divider comprising a number of series connected resistances, a positive voltage being connected to one terminal of said voltage divider and a negative voltage of the same magnitude to the other terminal of said voltage divider, said voltage divider having a neutral voltage divider point and a number of voltage divider points symmetrically located on each side of said neutral voltage divider point, the second voltage divider comprising two resistances connected in series between the output of said integrator means and said neutral voltage point, said neutral voltage point constituting the output of said integrator means, and a plurality of diodes, one terminal of each diode being connected to each voltage divider point of said first voltage divider, those diodes connected to voltage divider points with positive potential having their conduction direction toward the voltage divider point, those diodes connected to voltage divider points with negative potential having their conduction direction away from the voltage divider point, the other terminal of said diodes symmetrically located relative to said neutral voltage divider point being in pairs connected to a resistance and via said resistance to the voltage divider point of said second voltage divider.

5. The apparatus of claim 3 wherein said attenuator means comprises a second integrator means.

6. The apparatus of claim 5 wherein said amplitude compensating means compensates for the frequency dependent amplitude changes caused by both of said integrator means.

* * * * *